United States Patent [19]

Murata et al.

[11] 4,135,938

[45] Jan. 23, 1979

[54] HIGH DENSITY THERMAL SHOCK RESISTANT SINTERED SILICON CARBIDE

[75] Inventors: Yorihiro Murata, North Tonawanda; John A. Coppola, Lewiston; Carl H. McMurtry, Youngstown, all of N.Y.

[73] Assignee: The Carborundum Company, Niagara Falls, N.Y.

[21] Appl. No.: 783,356

[22] Filed: Mar. 31, 1977

[51] Int. Cl.² .................................................. C04B 35/56
[52] U.S. Cl. .................................................. 106/44; 264/65
[58] Field of Search .................... 106/44; 423/345; 264/65

[56] References Cited

U.S. PATENT DOCUMENTS

| | | | |
|---|---|---|---|
| 4,004,934 | 1/1977 | Prochazka | 106/44 |
| 4,031,178 | 6/1977 | Johnson et al. | 106/44 |

Primary Examiner—Winston A. Douglas
Assistant Examiner—J. V. Howard
Attorney, Agent, or Firm—David E. Dougherty; Raymond W. Green; Michael L. Dunn

[57] ABSTRACT

A dense thermal shock resistant silicon carbide ceramic body and its method of manufacture which comprises heat sintering a shaped body comprising particulate silicon carbide and an additive selected from boron nitride, boron phosphide, aluminum diboride and mixtures thereof.

25 Claims, No Drawings

HIGH DENSITY THERMAL SHOCK RESISTANT SINTERED SILICON CARBIDE

BACKGROUND OF THE INVENTION

1. Field of the Invention

This invention relates to pressureless sintered silicon carbide and more particularly relates to a pressureless sintered thermal shock resistant silicon carbide ceramic body which has high density, good electrical properties and good strength. The invention further relates to the method for manufacturing such a silicon carbide ceramic body.

2. History of the Prior Art

In the prior art silicon carbide ceramic bodies are generally made by one of two processes. One of the processes is hot pressing wherein particulate silicon carbide is pressed into a mold at high temperatures and pressures to form a shaped body. The other process is pressureless sintering wherein silicon carbide is preformed at low temperatures into a shape having the general shape of the finished body. The preforming is usually accomplished by pressing silicon carbide particles together at low temperatures. The preforming can also be accomplished by casting a dispersion of silicon carbide into a mold followed by driving off the dispersing liquid. Subsequent to preforming, the body is heated to an elevated temperature at approximately atmospheric pressure to form a finished silicon carbide ceramic body.

Pressureless sintering has certain advantages over hot pressing since equipment needed for forming the body is less complicated and less costly and since more intricate finished shapes are possible.

Until recently however, pressureless sintering has had serious disadvantages when compared with hot pressing since the resulting ceramic body had much lower strength and density than bodies which ae formed by hot pressing.

It has recently been discovered that pressureless sintered silicon carbide ceramic bodies could be obtained which have good strength and high density when boron carbide ($B_4C$) is incorporated into the silicon cabide prior to pressureless sintering. A detailed discussion of the method of making a dense silicon carbide ceramic body by the incorporation of boron carbide is disclosed in U.S. Pat. No. 4,004,934 entitled "Sintered Dense Silicon Carbide." That application further generally discloses that boron containing additives in general are good for increasing the density of pressureless sintered silicon carbide. It has, however, been found, contrary to that general statement, that many of such boron containing additives are not effective in increasing the density and strength of pressureless sintered products. The only two compositions which are disclosed by U.S. Pat. No. 4,004,934 are boron carbide and boron. The use of both of these products has substantial disadvantages since, while good strength and high density are obtained, the thermal shock resistance of the ceramic body is not sufficiently high for many applications and the electrical properties of the resulting ceramic body are undesirable in many applications since the large amounts of boron required through the addition of boron carbide or elemental boron result in positive doping characteristics which results in a very high cold electrical resistance which slows down heat up time in such applications as electrical ignitors and requires high driving voltages to obtain sufficiently high temperatures for these applications. Furthermore, the high driving voltages result in ignitors which are very difficult to control since once the initial cold resistance is overcome, resistance rapidly and sharply drops thus providing instantaneous current surges through the body which can easily result in ignitor burnout.

In order to obtain even acceptable electrical properties for many applications, negative dopants such as nitrogen or phosphorus must be incorporated into the finished ceramic body. For example, one method of incorporating such a dopant to overcome the effects of boron is heating the body in a nitrogen atmosphere either during or subsequent to sintering. Even when negative dopants are subsequently added, the electrical characteristics are not as good as desired since the desirable effects of the negative dopant simply neutralize the undesirable effects of the large amounts of boron present. In addition, the method for making a dense silicon carbide disclosed in U.S. Pat. No. 4,004,934 is not generally desirable for pressureless sintering of all crystalline forms of silicon carbide. In particular, the method seeks to avoid the alpha crystalline form.

It has subsequently been discovered and disclosed that high density silicon carbide ceramic bodies can be formed with boron carbide starting with the more readily obtainable alpha crystalline form of silicon carbide when at least about 1.5 percent of carbon is incorporated into the sintering composition. The method for obtaining pressureless sintered high density silicon carbide from the alpha crystalline form is disclosed and discussed in U.S. Patent Application Ser. No. 584,226 filed June 5, 1975 by J. A. Coppola, L. N. Hailey and C. H. McMurtry.

Boron containing additives other than elemental boron and boron carbide have been utilized in hot pressing operations. For example, boron nitride has been used in obtaining silicon carbide ceramic bodies to improve electrically conducting properties. Such a composition and its method for preparation is disclosed in U.S. Pat. No. 3,960,577. There is, however, no indication that boron nitride would be one of the few boron containing additives which might increase the density of a pressureless sintered silicon carbide body while retaining the desirable electrically conducting properties imparted by the boron nitride in hot pressing methods.

BRIEF DESCRIPTION OF THE INVENTION

The invention is a method for making a dense thermal shock resistant silicon carbide ceramic body by pressureless sintering which results in obtaining a high density high strength silicon carbide ceramic body which has improved thermal shock resistance and improved electrical properties for many electrical applications. The method comprises blending silicon carbide consisting essentially of particles having a particle size below about 3 microns with from about 0.3 to about 3 weight percent of an additive composition selected from the group consisting of boron nitride, boron phosphide, aluminum diboride and mixtures thereof and with from about 150 to about 500 percent carbon by weight of additive; forming the blend into a shaped body; and heating the shaped body in an inert environment at a temperature of from about 1900° C. to about 2500° C. for a time sufficient to obtain a ceramic body having a density of at least 85 percent of the theoretical density of solid silicon carbide.

The composition of the resulting high density thermal shock resistant silicon carbide ceramic body is not precisely known but is believed to comprise silicon carbide in solid solution with the additive compound and in accordance with the invention, comprises a pressureless sintered composition containing silicon carbide and from about 0.3 to about 3 weight percent of an additive compound selected from the group consisting of boron nitride, boron phosphide, aluminum diboride and mixtures thereof. In addition to the carbon in the original particulate silicon carbide, the body contains from about 150 to about 500 percent carbon by weight of additive. It is believed that most of the additional carbon is chemically combined with the silicon carbide and additive compound during the heating of the shaped body in the inert environment.

DETAILED DESCRIPTION OF THE INVENTION

The silicon carbide particles may be blended with the additive composition and the carbon by any suitable means such as introducing a mixture of the silicon carbide, additive and carbon into a ball mill for from about 1 to 24 hours or such as slurrying the silicon carbide additive and carbon into a liquid. The liquid may be removed leaving a silicon carbide, additive, carbon blend or the liquid may contribute all or part of the carbon component of the blend and become carbonized during heating.

The particle size of the silicon carbide utilized in the method of the invention should be below 3 microns and is desirably sub micron. Similarly, the particle sizes of the additive and of the carbon should be below about 3 microns and desirably sub micron. The silicon carbide for use in accordance with the invention may be of any common crystal form such as alpha or beta silicon carbide.

The carbon which is used in the method of the invention may be in the form of free carbon such as graphite or as previously mentioned, may be added in the form of any carbonizable organic composition desirably consisting of elements selected from a group consisting of carbon, nitrogen, hydrogen and oxygen and is desirably a carbon compound which has a high ratio of carbon to the remaining elements.

Desirable carbon compounds are carbonizable organic polymers, low molecular weight aromatic compounds and high molecular weight aromatic compounds. Examples of suitable polymers include phenol formaldehyde resins and polyolefins. Examples of low molecular weight aromatic compounds include benzene, toluene, xylene, naphthalene and anthracene. Examples of high molecular weight aromatic organic compounds include aromatic condensation resins such as phenol formaldehyde resins, aniline-formaldehyde resins, cresole-formaldehyde resins, resorcinal-formaldehyde resins, dibenzanthracene, polyphenylene and polymethylphenylene. The most preferred group of compounds when carbon is to be obtained by carbonization are the high molecular weight aromatic compounds since they yield large amounts of carbon upon carbonization.

In general, from about 0.3 to about 3 weight percent of an additive composition selected from a group consisting of boron nitride, boron phosphide and aluminum diboride or mixtures thereof are utilized in the blend. It has been unexpectedly found that when one of these particular additive compositions are utilized, the resulting silicon carbide ceramic body has a superior combination of properties including high density, good strength, good thermal shock resistance, good oxidation resistance, and excellent heat resistance. When known prior art additive compositions were utilized to obtain high density sintered silicon carbide, the foregoing superior combination of properties was not obtained.

For example, when boron carbide is used as the additive composition for obtaining high density, high density is obtained along with good strength, however, the thermal shock resistance is inferior to the thermal shock resistance of the silicon carbide ceramic body obtained when boron nitride, boron phosphide or aluminum diboride is used as the additive. Furthermore, when the silicon carbide ceramic body is to be used in electrical applications such as electrical ignitors, the electrical characteristics obtained when the additive composition is boron carbide, are inferior to the characteristics obtained when an additive selected from boron nitride and boron phosphide in accordance with the invention is used. While not wishing to be bound by any particular theory, it is believed that the high boron content of boron carbide increases the p doping of the silicon carbide which is not found to be as desirable as n doping in many electrical applications.

The blend may be formed into a shaped body by any suitable means such as pressing the blend at a pressure of from about 100 kilograms per square centimeter to about 2000 kilograms per square centimeter and most desirably from about 350 kilograms per square centimeter to about 1400 kilograms per square centimeter. Alternatively, the blend may be formed into a shaped body by slurrying the blend into a liquid, casting the blend and evaporating all or most of the liquid.

The formed body is sintered by heating it in an inert atmosphere at a temperature of from about 1900° C. to about 2500° C. for a time sufficient to obtain a ceramic body having a density of at least 85 percent of the theoretical density of solid silicon carbide. The most desirable temperature is from about 2100° C. to about 2200° C. The heating, i.e. sintering time is usually from about 15 to about 120 minutes, preferrably for about 30 to about 90 minutes and most preferrably from about 40 to about 60 minutes.

The inert environment is usually an atmosphere of helium, argon, nitrogen, hydrogen or mixtures thereof and is most desirably a rare gas selected from helium and argon. Due to its availability, the most desirable gas is argon. In addition, the inert environment may be a vacuum which is preferrably below about 1mm of mercury of pressure absolute and most preferrably below about $1 \times 10^{-3}$mm of mercury absolute. When increased negative doping of the resulting silicon carbide is desired, nitrogen is frequently used as an inert atmosphere since the nitrogen either combines with or dissolves into the silicon carbide to improve negative doping characteristics.

Since density and strength of the resulting body generally have a direct correlation, the conditions and amounts of additives are experimentally selected to obtain the highest possible density which is usually at least 95 percent of the theoretical density of solid silicon carbide.

When high densities and strengths are the most desirable characteristics to be maximized, boron nitride or boron phosphide is generally used as the additive compound and the sintering temperature is then usually between 2100 to about 2200° C. When increased thermal shock resistance is the most desirable physical property of the silicon carbide body to be maximized, the additive compound is preferrably aluminum diboride and the sintering temperature is preferrably selected from about 2000° C. to about 2100° C. In order to obtain maximum density, the ratio of carbon to the additive compound is from about 3 to 1 to about 5 to 1 when the additive compound is aluminum diboride. When the additive compound is boron nitride or boron phosphide, the ratio of carbon to additive in order to maximize the density of the ceramic body is from about 1.5 to 1 to about 4 to 1 by weight. The highest densities, when the additive is aluminum diboride, are obtained when from about 0.5 to about 2 percent of aluminum diboride by weight of silicon carbide is incorporated into the blend. The highest densities, when the additive is boron nitride or boron phosphide, are obtained when from about 1 percent to about 3 percent of additive is incorporated into the blend.

The following examples are included to illustrate and not to limit the method of the invention for obtaining the novel silicon carbide ceramic body. Unless otherwise indicated, all parts and percentages are by weight.

EXAMPLE 1

About 15 grams of a composition consisting of ninety-five weight percent of particulate silicon carbide having a mean particle size of about 0.5 microns is blended with one weight percent of boron carbide additive and four weight percent of a phenolformaldehyde resin and the composition is ball milled with tungsten carbide balls in a plastic jar for about eight hours in the presence of enough acetone to dampen the composition. The composition is then dried and sifted through an 80 mesh screen. About 14 grams of the resulting powder is then cold pressed at about 1000 kilograms per square centimeter of pressure in a 3.75 centimeter diameter mold to form a compact about 3.75 centimeters in diameter by about 0.7 centimeters high. The compact is then sintered at about 2200° C. for about 45 minutes in an argon atmosphere at atmospheric pressure to obtain a sintered silicon carbide dish shaped body having a density of about 96.98% of the theoretical density of silicon carbide.

EXAMPLES 2 through 7

The procedure of Example 1 is followed except that the additive is changed. The results are found in Table 1.

TABLE 1

| EXAMPLE | ADDITIVE | DENSITY (%) |
|---|---|---|
| 2. | Boron Phosphide (BP) | 96.26 |
| 3. | Boron Nitride (BN) | 95.67 |
| 4. | Aluminum Diboride (AlB$_2$) | 94.67 |
| 5. | Boron Trioxide (B$_2$O$_3$) | 92.68 |
| 6. | Titanium Diboride (TiB$_2$) | 66.29 |

TABLE 1-continued

| EXAMPLE | ADDITIVE | DENSITY (%) |
|---|---|---|
| 7. | Zirconium Diboride (ZrB$_2$) | 61.59 |

Examples 2 through 4 show that the use of BP, BN and AlB$_2$ as sintering additives result in sintered compositions having densities within five percent of the maximum theoretical density of silicon carbide which is 3.21.

Examples 5 through 7 show that other boron containing compounds are not necessarily good additives for increasing the density of sintered silicon carbide.

EXAMPLE 8

The procedure of Example 1 is followed except the compact is sintered at 2150° C. for 30 minutes and 0.5 weight percent of boron carbide is used. The electrical resistance of the resulting body between the faces of the disk is then measured. The resulting body is then tested for thermal shock resistance by heating it in a furnace for 20 minutes to a predetermined temperature and then immediately quenching it in 40° C. water. The results are shown in Table 2.

EXAMPLES 9 through 11

The procedure of Example 8 is followed except different additives are used. The results are in Table 2.

TABLE 2

| EXAMPLE | % | ADDITIVE | ELECTRICAL RESISTANCE | HEATING TEMPERATURE | | | | | | |
|---|---|---|---|---|---|---|---|---|---|---|
| | | | | 200° | 300° | 400° | 500° | 600° | 700° | 800° |
| 8 | 0.5% | B$_4$C | 250Ω | E | S | F | | | | |
| 9 | 1.0% | BP | 2.8Ω | E | G | S | S | S | F | |
| 10 | 1.0% | BN | 3.6Ω | E | E | G | G | S | F | |
| 11 | 0.5% | AlB$_2$ | 1.2Ω | E | E | G | G | S | S | F |

E Excellent-no cracks
G Good-hairline crack visible under magnification or slight edge chip
S Satisfactory-hairline cracks visible or small edge chip
F Failure-large visible crack

What is claimed is:

1. A dense thermal shock resistant silicon carbide ceramic body which comprises a pressureless sintered composition comprising silicon carbide, and from about 0.3 to about 3 weight percent of aluminum diboride.

2. The body claimed in claim 1 wherein said composition further contains from about 150 to about 500 percent carbon by weight of aluminum diboride.

3. The body claimed in claim 1 wherein said carbon is added in the form of an organic composition prior to said sintering.

4. The body claimed in claim 1 wherein said silicon carbide, prior to said sintering, consists essentially of sub micron silicon carbide particles.

5. A method of making a dense thermal shock resistant silicon carbide ceramic body which comprises:
    (a) blending silicon carbide consisting essentially of particles having a particle size below about 3 microns with from about 0.3 to about 3 weight percent of aluminum diboride and with from about 150 to about 500 percent carbon by weight of additive;
    (b) forming the blend into a shaped body; and
    (c) heating the shaped body in an inert environment at a temperature of from about 1900° C. to about 2500° C. for a time sufficient to obtain a ceramic body having a density of at least 85 percent of the theoretical density of solid silicon carbide.

6. The method of claim 5 wherein said silicon carbide consists essentially of sub micron size particles.

7. The method of claim 6 wherein said aluminum diboride is a particulate solid having essentially all particles of a size below about 3 microns.

8. The method of claim 7 wherein the aluminum diboride consists essentially of sub micron particles.

9. The method of claim 7 wherein said heating time is from about 30 to about 90 minutes.

10. The method of claim 7 wherein the silicon carbide, aluminum diboride and carbon are blended in a ball mill.

11. The method of claim 7 wherein the blend is pressed at a pressure of from about 100 kilograms per square centimeter to about 2000 kilograms per square centimeter.

12. The method of claim 11 wherein the blend is pressed at a pressure of from about 350 kilograms per square centimeter to about 1400 kilograms per square centimeter.

13. The method of claim 11 wherein the inert environment comprises an atomsphere of argon, nitrogen, hydrogen, helium or mixtures thereof.

14. The method of claim 13 wherein the inert atmosphere is argon.

15. The method of claim 13 wherein the inert atmosphere is nitrogen.

16. The method of claim 11 wherein the inert environment is a vacuum below about $1 \times 10^{-3}$ mm of mercury of pressure absolute.

17. The method of claim 13 wherein the density is at least 95 percent of theoretical.

18. The method of claim 11 wherein the carbon is added as carbon compound consisting of elements selected from the group consisting of carbon, nitrogen, hydrogen and oxygen.

19. The method of claim 18 wherein the carbon compound is a high molecular weight aromatic organic compound.

20. The method of claim 19 wherein the carbon compound is an organic polymer.

21. The method of claim 20 wherein the polymer is a phenol formaldehyde resin.

22. The method of claim 13 wherein the temperature is from about 2000° C. to about 2100° C.

23. A dense thermal shock resistant silicon carbide ceramic body which comprises a pressureless sintered composition comprising silicon carbide, and from about 0.3 to about 3 weight percent of boron nitride.

24. A method of making a dense thermal shock resistant silicon carbide ceramic body which comprises:
(a) blending silicon carbide consisting essentially of particles having a particle size below about 3 microns with from about 0.3 to about 3 weight percent of boron nitride and with from about 150 to about 500 percent carbon by weight of additive;
(b) forming the blend into a shaped body; and
(c) heating the shaped body in an inert environment at a temperature of from about 1900° C. to about 2500° C. for a time sufficient to obtain a ceramic body having a density of at least 85 percent of the theoretical density of solid silicon carbide.

25. The method of claim 24 wherein said silicon carbide consists essentially of sub micron size particles.

* * * * *